Oct. 14, 1958  T. B. CHACE  2,856,132
HEATER SYSTEMS FOR VEHICLES AND PRESSURE
COMPENSATING CONTROL VALVES THEREFOR
Filed June 16, 1953  4 Sheets-Sheet 3

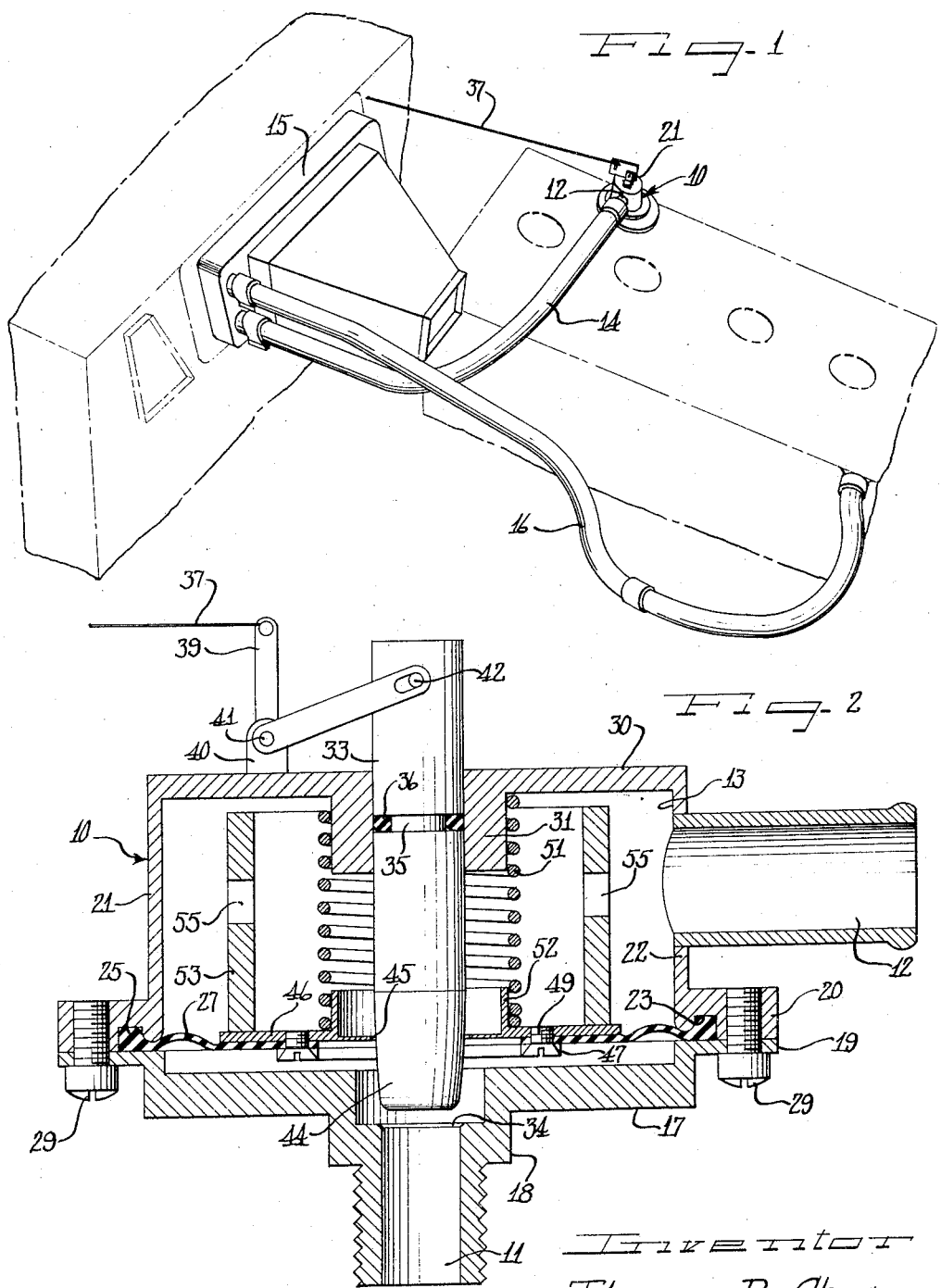

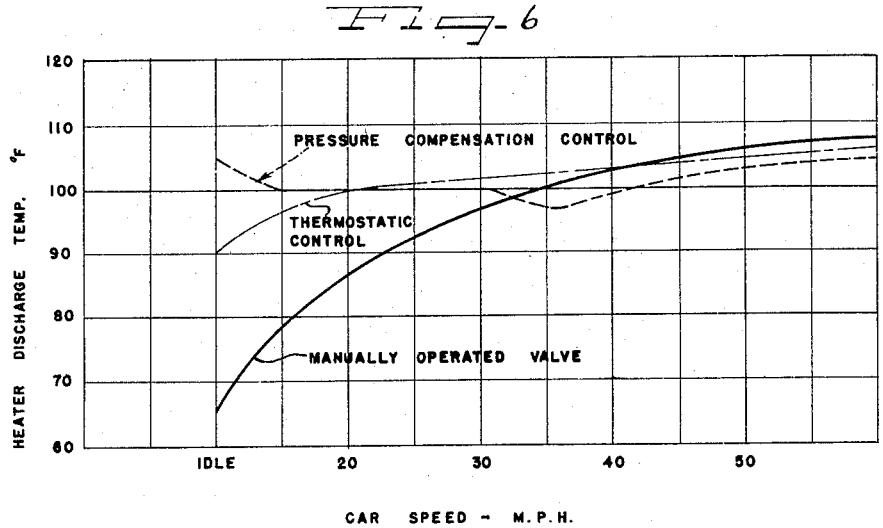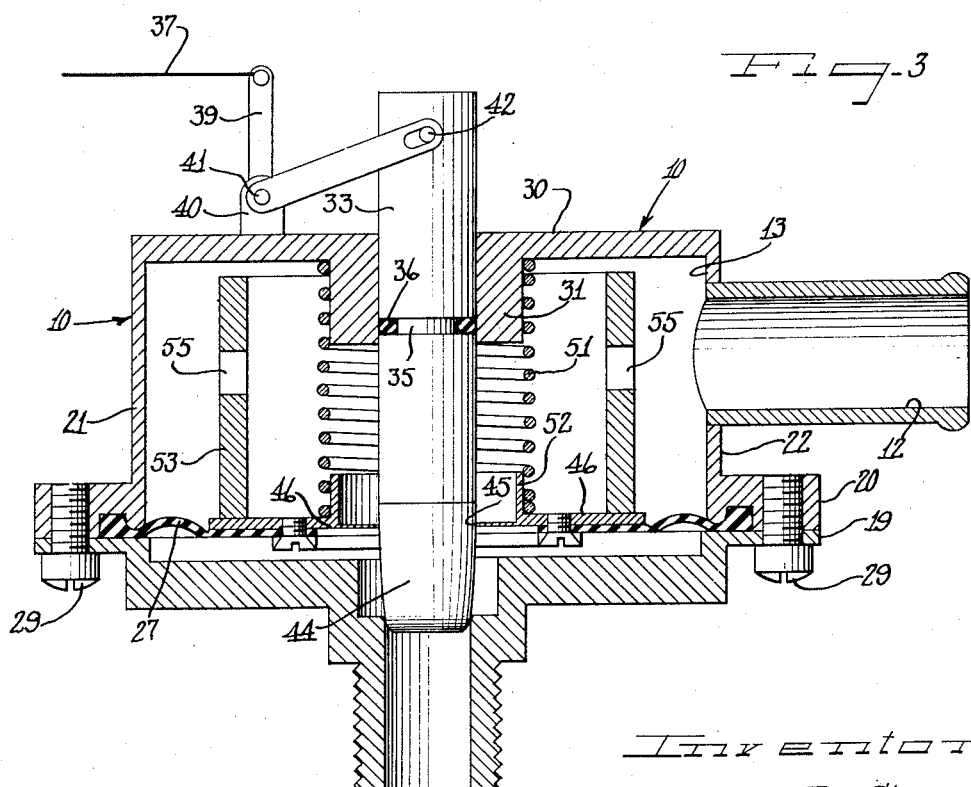

Inventor
Thomas B. Chace
Hill, Sherman, Meroni, Gross & Simpson
Attys

Oct. 14, 1958     T. B. CHACE     2,856,132
HEATER SYSTEMS FOR VEHICLES AND PRESSURE
COMPENSATING CONTROL VALVES THEREFOR
Filed June 16, 1953     4 Sheets-Sheet 4

Thomas B. Chace

United States Patent Office 2,856,132
Patented Oct. 14, 1958

2,856,132

HEATER SYSTEMS FOR VEHICLES AND PRESSURE COMPENSATING CONTROL VALVES THEREFOR

Thomas B. Chace, Winnetka, Ill., assignor to The Dole Valve Company, Chicago, Ill., a corporation of Illinois Application June 16, 1953, Serial No. 361,929

10 Claims. (Cl. 237—8)

This invention relates to improvements in heater systems for vehicles and pressure compensating control valves particularly adapted for use in such systems.

Heretofore, one difficulty in hot water heaters for vehicles has been excessive fluctuation in temperature as the speed of the car varies, due to the varying volumes of hot water supplied to the car heater, caused by the variation in speed of the engine.

Attempts have been made to remedy this deficiency by controlling the volume of water supplied to the heater by thermostats. Thermostatic controls, however, have not been entirely satisfactory, due to the time lag between operation of thermostatically controlled valve and the change in temperature within the car, and the fact that it has not been possible to anticipate the variations in speed of the car and the resultant variation in volume of hot water delivered by the engine.

A principal object of my invention is to remedy this deficiency by providing a heater control system for a passenger vehicle, providing a uniform selected temperature for the passenger compartment of the vehicle regardless of variations in speed of the vehicle.

A further object of my invention is to provide a novel and improved form of heater control and valve therefor arranged to improve upon the heating characteristics of the heater, over those formerly attained by thermostatic control valves.

A still further object of my invention is to provide a novel and improved form of hot water heating system for a vehicle utilizing a pressure compensating valve arranged to provide a uniform selected volume of hot water to the vehicle heater for all operating conditions of the vehicle.

Still another object of my invention is to provide a heater control system wherein a manual selection of the volume of hot water to be supplied to the heater will provide the uniform selected temperature for the interior of the car, without resorting to the use of thermostats heretofore provided for this purpose.

A still further object of my invention is to provide a pressure compensating control valve for delivering a selected uniform volume of fluid, regardless of variations in the volume of fluid delivered to the valve, by providing an orifice member having an orifice movable along a metering pin by the pressure of inlet fluid on the orifice member, and by balancing the orifice member by a varying rate spring loaded in relation to pressure on the orifice member.

A still further object of my invention is to provide a novel and improved form of flow control valve having a variable annular orifice in which a selected delivery range is attained by varying rate spring means and in which the area of the orifice may be varied for the delivery range desired.

Another and important object of my invention is to provide a novel and improved form of flow control valve particularly adapted for supplying hot water to an automobile heater wherein variations in the temperature of the hot water delivered to the heater are reduced to a minimum by controlling the flow of hot water to the heater by a movable orifice movable by inlet pressure along a tapered metering pin and balanced in accordance with a required rate of flow by spring means augmented by a weight.

Still another and more detailed object of my invention is to provide a novel, efficient and simplified form of flow control valve wherein the control of the flow of hot water through the valve is controlled by the pressure of the water acting against a balanced movable orifice member moving along a converging metering pin of a smaller cross-sectional area than the cross-sectional area of the orifice of the orifice member for the entire range of movement of the orifice member and within the adjustable range of the metering pin.

These and other objects of my invention will appear from time to time as the following specification proceeds and with reference to the accompanying drawings wherein:

Figure 1 is a partial diagrammatic view illustrating the association of the pressure compensating control of my invention with the cylinder head of an internal combustion engine and showing the connections from the valve and engine to the car heater;

Figure 2 is a transverse sectional view taken through a pressure compensating valve constructed in accordance with my invention and showing the valve in a position to provide a selected delivery volume of water;

Figure 3 is a view somewhat similar to Figure 2 but showing the valve in a fully closed position;

Figure 6 is a graph showing a comparison of the control characteristics of various types of heater controls with the pressure compensating control of my invention;

Figure 7:
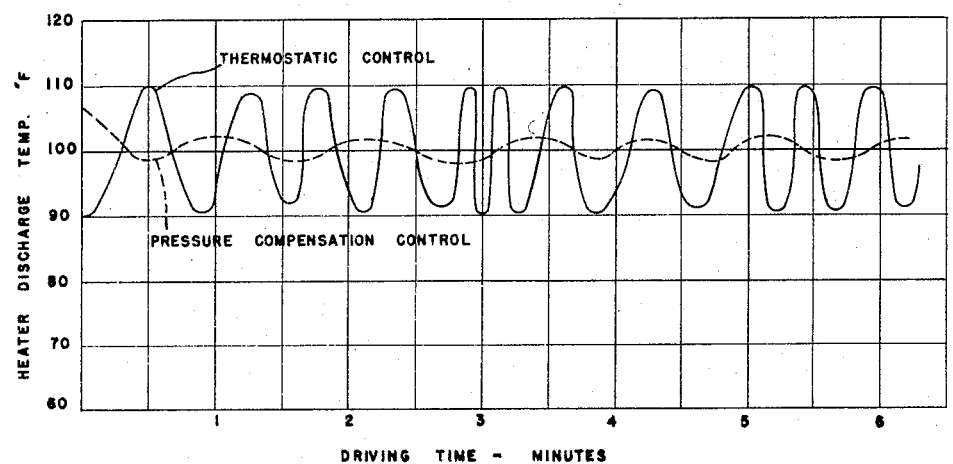
Figure 8:
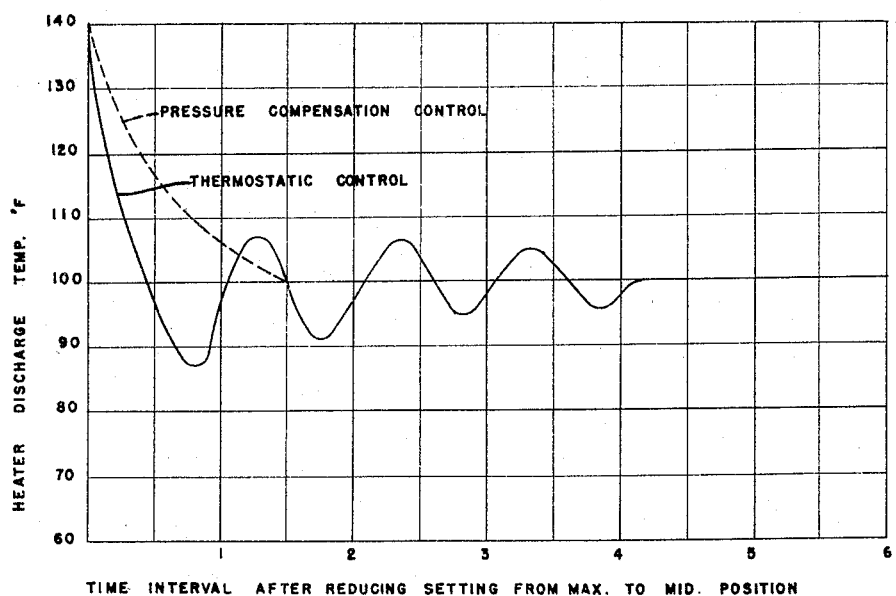

Figure 7 is a graph comparing the control characteristics of the heater control of my invention with those of a thermostatic control, when driving in heavy traffic; and Figure 8 is a graph comparing the inherent control characteristics of the pressure compensation control of my invention with that of a thermostatic control, when moving the temperature selector lever at the dashboard of a car from a maximum to a mid-position.

Referring now to the embodiment of my invention illustrated in the drawings, I have shown in Figure 1 a pressure compensating valve 10 mounted on the cylinder head of an automobile engine to take water from the water jacket of the engine. It should be understood, however, that the pressure compensating valve of my invention may be used for various flow control purposes and is not limited for use with a cooling system for an automotive vehicle.

The valve is shown in Figures 1, 2 and 3 as having a projecting inlet passageway 11 which may be externally threaded, to be threaded within the cylinder head of the engine and have communication with the water jacket therein. The valve is also shown as having an outlet 12 leading from a chamber 13 for the valve 10 and connected with a hose 14 for a heater 15 to supply hot water thereto. A return hose 16 leads from the heater and is connected to the engine on the suction side of the water circulating pump therefor (not shown) as is well known to those skilled in the art.

The chamber 13 for the pressure compensating valve 10 is shown in Figures 2 and 3 as comprising a casing plate 17 having a boss 18 depending from the central portion thereof and from which the inlet passageway 11 extends. The plate 17 has an annular flange 19 abutted by an annular flange 20 extending from the lower end portion of a generally cylindrical casing member 21. The casing 21 is shown as being of a generally cylindrical form with a closed top 30 and with the outlet 12 leading from a wall 22 thereof in vertically spaced relation with respect to the inlet 11.

The under surface of the annular flange 20 of the casing 21 is shown as having an annular groove or recess 23 extending therearound and opening to the interior of said casing, into which fits the rib of a ribbed rim 25 of a flexible diaphragm 27. The casing 21 is secured to the flange 19 of the plate 17 by means of machine screws 29, 29 shown as being threaded in the flange 20 and as pressing the diaphragm 27 into engagement with the flange 19, and providing a fluid-tight joint between the flanges 19 and 20.

The top 30 is shown as having an annular boss 31 depending from the center thereof, within the interior of said casing, and as having a flow control or metering pin 33 slidably mounted therein and extending within the interior of the casing 21 into position to engage a shouldered inner end portion 34 of the inlet 11, and block the flow of fluid therethrough when desired. The metering pin 33 is shown as having an annular groove 35 extending therearound, within which is mounted a suitable sealing member, such as O-ring 36, engageable with the interior wall of the annular boss 31, to prevent the leakage of fluid from the chamber 21 along said metering pin.

The metering pin 33 may be moved along the chamber 21 from a valve closing position in engagement with the shoulder 34 to a wide open position out of the range of movement of the diaphragm 27 by the usual Bowden wire operated from the dashboard of the car. As herein shown a Bowden wire 37 has connection with one lever arm of a bellcrank 39 pivotally mounted on the top 30 of the casing 21 on a bracket 40, by means of a pivot pin 41. The other lever arm of the bellcrank 39 is shown as being forked and as extending along each side of the pin 33 and as being pivotally connected thereto by means of a pivot pin 42. A control button or lever (not shown), located on the dashboard of the car may be connected with the free end of the Bowden wire and may be calibrated for varying temperature conditions, to control the position of the metering pin 33 with respect to an orifice 45 of a movable orifice member 46. The movable orifice member 46 is herein shown as being a diaphragm plate secured to the upper surface of the diaphragm 27, as by a retaining ring 47 and machine screws 49, 49 extending therethrough, and threaded within the diaphragm plate 46.

It should here be noted that the orifice member 46 is relatively rigid and that the cross sectional area of the orifice 45 is greater than the cross sectional area of the converging lower end portion of the metering pin 33 throughout the range of movement of said orifice member in any position of adjustment of said metering pin, and that said metering pin is always free from said orifice in all positions of adjustment said metering pin including its position when in engagement with the inlet 11, to block the flow of fluid therethrough.

The diaphragm plate 46 and orifice 45, as well as the diaphragm 27, are herein shown as being balanced against the pressure of fluid passing through the inlet 11 by means of a compression spring 51 augmented by an annular weight 53. The compression spring 51 is shown as encircling the depending boss 31 at its upper end and as encircling at its lower end an annular collar 52 spaced outwardly from the orifice 45 and extending upwardly from the diaphragm plate 46. The annular weight 53 is shown as being mounted on the diaphragm plate 46 adjacent the outer periphery thereof and as extending upwardly therefrom and serves to add to the mass of the diaphragm plate 46 and to initially retard movement thereof along the metering pin 44 in cooperation with the spring 51. The spring 51 and weight 53 may be calibrated for the required flow conditions for the various pressure ranges which may be encountered.

As herein shown, the annular weight 53 is of a generally cylindrical form and is apertured as indicated by reference characters 55, to accommodate the free flow of the fluid therethrough into the outlet 12. The upper wall of the weight 53 also limits the range of upward movement of the diaphragm 27.

During normal operation of the heater, the metering pin 33 may be positioned as shown in Figure 2 with its metering end 44 extending through the orifice 45, but free from the inlet 11, so as to form an annular orifice accommodating the flow of fluid under pressure into the valve chamber 13 on the diaphragm side of the diaphragm 27. The pressure of fluid acting on the diaphragm 27 will balance the spring 51 and the weight 53 under normal operating conditions. Hot water will then flow through the annular flow control orifice formed by the orifice 45 and the metering portion of the pin 33.

As the pressure of the hot water increases an amount sufficient to counteract the balancing effect of the spring 51 and weight 53, due to increasing speeds of the engine, the pressure of the water will move the diaphragm plate 46 and orifice 45 upwardly along the metering end 44 of the metering pin 33, and restrict the annular flow control orifice formed by the space between the orifice 45 and the metering end of the pin 33, until the spring 51 and weight 53 are again balanced, at which time the rate of flow of hot water delivered through said orifice will be proportioned in accordance with the reduced area annular orifice, and increased pressure to provide substantially the same rate of flow of hot water to the heater for the higher engine needs as for the slower engine speed.

In a contrary manner, as the pressure on the diaphragm side of the diaphragm 27 is reduced, the opening between the orifice 45 and the tapered metering end 44 of the pin 33 will increase in cross-sectional area, to compensate for the reduced pressure and volume of the water entering the valve chamber, and provide substantially the same rate of flow of water for this reduced pressure and volume as for the increased pressure and volume effected by higher engine speeds.

When it is desired to shut off the flow of hot water into the valve chamber 21, the Bowden rod is depressed to engage the free end of the pin 33 with the shouldered portion 34 of the inlet 11, and block the flow of water into the valve chamber. It will be noted from Figure 3, that when the metering pin 33 is in the blocking position shown, that the tapered end portion 44 of said metering pin is free from the orifice 45, to relieve the diaphragm 27 and diaphragm plate 46 from unbalancing or unnatural pressure forces acting against the diaphagm and plate, the only forces acting against said diaphragm being that of the weight 53 and spring 51 moving the diaphragm downwardly to its unstressed free position.

When it is desired to entirely disconnect the flow control features from the valve, it is merely necessary to move the metering pin 33 vertically until its lower end is out of registry with the orifice 45 in the orifice plate 46, and thus accommodate the free flow of fluid through the orifice 45.

Figure 4:
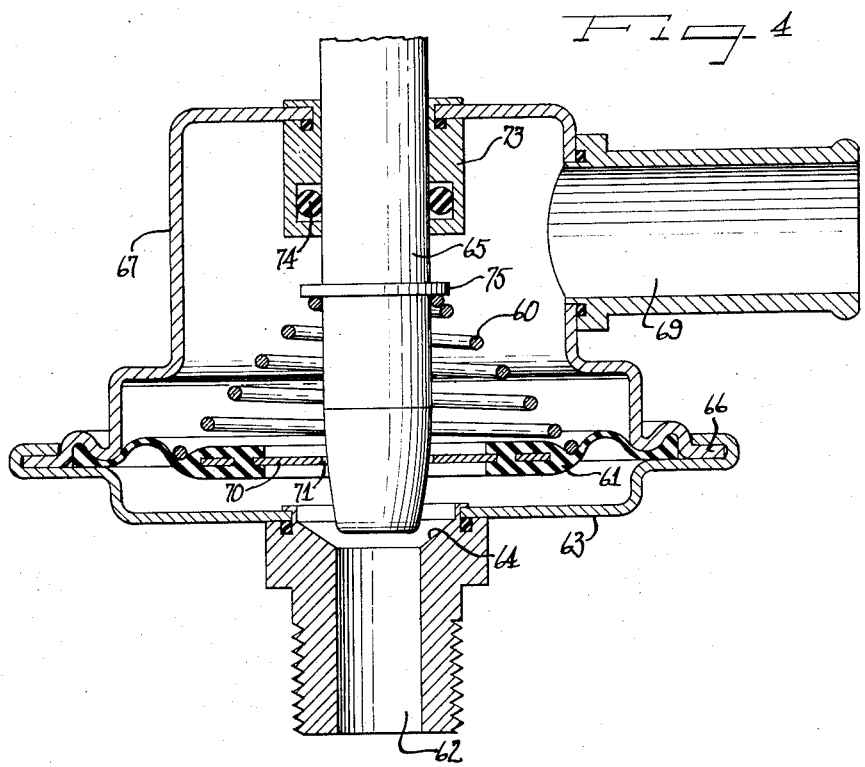
Figure 4 is a transverse sectional view taken through a modified form of pressure compensating valve constructed in accordance with my invention.

In the modified form of my invention illustrated in Figure 4 of the drawings, I have shown a conical or varying rate spring 60 balancing pressure on the diaphragm 61 and loaded in relation to the pressure on said diaphragm.

In this form of my invention an inlet fitting 62 is mounted on the bottom of a dished plate 63. Said inlet fitting has a frusto-conical outlet orifice 64 leading into said plate and adapted to be engaged by the end of a metering pin 65, like the metering pin 33, when it is desired to shut off the flow through said inlet fitting. The plate 63 is shown as being crimped to a flanged rim 66 of a casing 67, herein shown as being of an inverted generaly cup-like shape having the flange 66 extending from the bottom thereof and abutting the rim of the plate 63 and having the rim of said plate crimped thereover. The diaphragm 61 is shown as being maintained in engagement with the rim of the plate 63 as in the form of my invention illustrated in Figures 2 and 3, to hold the diaphragm in position and also to maintain a fluid tight joint between the casing 67 and plate 63. An outlet fitting 69 is shown as leading from a wall of the casing 67 in spaced relation with respect to the inlet fitting 62.

Figure 5:
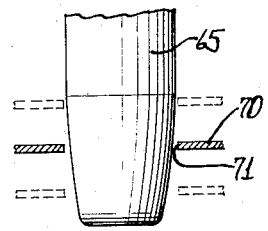
Figure 5 is a diagrammatic view illustrating several positions of the metering pin with respect to the movable orifice and showing the clearance between the metering pin and orifice in its various positions of adjustment.

The diaphragm 61 is shown as having an open central portion and as having a diaphragm plate 70 embedded therein and extending inwardly of said open central portion. The diaphragm plate 70 is shown as forming a rigid orifice member having an orifice 71 leading therethrough free from the metering pin 65 in all positions of movement of said orifice member along said metering pin and in all positions of adjustment of said metering pin as in the form of my invention shown in Figures 2 and 3, and as diagrammatically shown in Figure 5.

The metering pin 65 is shown as being slidably mounted within a sleeve 73 secured to the top of the casing 67 and depending within said casing and as being sealed to said casing as by an O-ring 74. The metering pin 65 may be moved along the orifice 71 from a position in engagement with the frusto-conical outlet orifice of the inlet 62 to a position substantially free from said orifice, when it is desired to accommodate the free flow of fluid through the valve by the usual Bowden wire, as shown in the form of my invention illustrated in Figures 1 and 2.

The metering pin 65 is shown as having a collar 75 thereon intermediate its ends, abutted by the small diameter end of the conical spring 60. The opposite end of the spring 60 is seated on the diaphragm 61.

With the form of my invention illustrated in Figure 4 the conical spring 60 replaces the weight and spring 51 and the compressive force thereof increases as the diaphragm moves upwardly along the metering pin 65 upon increases in pressure on said diaphragm. The spring 60 is so proportioned and loaded in relation to inlet pressure on the diaphragm 61 as to provide a substantially constant rate of flow for any adjusted position of the metering pin 65 and throughout the entire range of movement of the orifice 71 along said metering pin for the entire range of pressures to which the diaphragm is subjected. This provides a substantially constant flow control over a wide range of pressures, and as the metering pin 65 is adjusted to a lower or higher flow rate, the rate of deflection of the diaphragm also varies to increase the accuracy of the flow control throughout a wide range of pressures for any desired position of adjustment of the metering pin 65.

In Figures 6, 7 and 8, I graphically show comparative operating data between the control system of my invention and the more or less conventional car heater controls taken under the same operating conditions in the same car. In Figure 6 the solid line indicates the temperature of the air discharged by the heater within the car from an idling condition of the engine up to driving speeds of 60 miles an hour, under the control of a manually operated control valve set at a mid-setting to deliver the required volume of water to maintain the inside temperature of the car comfortable for average winter driving conditions. With the manual valve, the temperature of air discharged by the heater varies 43° F. from a condition where the engine is idling to a condition where the car is traveling 60 miles an hour.

The dot and dash line indicates the temperature conditions where the heater is controlled by a conventional thermostatic control. With this type of control the delivery temperature of the air from the heater at low engine speeds is considerably higher than with the manual control valve and the variation in temperature from an engine idling speed to a car speed of between 20 and 60 miles an hour is approximately 16 degrees, which is considerably better than with the 43 degree variation with the manually controlled valve, but still does not give the uniform temperature desired.

The dotted line in Figure 6 indicates the heater temperature with the use of the pressure compensating control of my invention as shown in Figures 2 and 3. With this control the temperature of the air delivered by the heater is as high when the engine is idling as when the car is running at 60 miles an hour, assuring a comfortable car under all driving conditions. The temperature variation is only eight degrees and is never over or under 5° of the desired temperature of 100° required for average heating conditions.

Figure 7 is a comparison between the variations in temperature of air delivered by the heater between a thermostatically controlled heater valve and the pressure compensating control of my invention when driving in heavy traffic. The graphs of this figure show that with the thermostatic control, the temperature of the air delivered by the heater continually varies as much as 20°, or 10° above and below a normal heating temperature, while with the pressure compensation control of my invention the entire variation in temperature of delivered air is never more than five degrees and normally varies only 2° above and below a normal temperature of 100°.

Figure 8 shows a comparison between a thermostatic heater control and a pressure compensation control of my invention when the temperature selection lever of each control is moved from a maximum to a mid-position. It may be seen from this graph that with the thermostatic control, there is a rapid drop in temperature in the first 45 seconds and that there is then a variation in temperature of more than 7° above and below the required temperature of 100° for a period of a little over 4 minutes, at which time the temperature of the air delivered by the heater levels off to a temperature of 100°. With the pressure compensation control of my invention, there is a gradual reduction in temperature for the first minute and a half and the temperature of the delivered air then levels off to 100° and stays at substantially this temperature.

It may be seen from these figures that with the pressure comperation control of my invention the difficulty in controlling the temperature in the interior of the car due to the lag between temperature changes of the air delivered by the heater and the desired temperature, inherent in thermostatic heater controls, has been remedied, and that the pressure compensation control of my invention provides a substantially uniform temperature of delivered air from the car heater, for all operating conditions of the car, including operation in heavy traffic and changes in speed from an idling speed of the engine to maximum highway speeds.

It may further be seen that the accuracy in the flow control is attained by a movable rigid orifice moved along a tapered metering pin by the pressure of the water supplied by the engine manihold and balanced by the weight and spring loaded in relation to pressure on the diaphragm, and that the flow of water through the orifice is never shut off within the adjustable range of the metering pin.

It may also be seen that the accuracy in the rate of flow is attained by the tapering contour of the metering pin, the orifice movable along the metering pin in accordance with pressure changes and free from the metering pin in all positions thereof along the metering pin and the variable rate load on the diaphragm opposing movement of the diaphragm along the metering pin and loaded in relation to pressure on the diaphragm.

It should further be noted that the free flow of fluid between the orifice and tapered end of the metering pin overcomes the rapid temperature drops heretofore present with flow control valves for heaters, where the pressure on the flow control may be so great as to completely close off the valve, resulting in a rapid temperature drop in the air delivered by the heater.

It may further be seen that the valve may be in a fully on-position to accommodate the free flow of hot water through the valve with no flow control features, or may be in a full shut-off position, and that when in a full shut-off position the metering pin is free from the flow control orifice and relieves the diaphragm from all unbalanced pressure.

It will be understood that modifications and variations may be effected without departing from the scope of the novel concepts of the present invention.

I claim as my invention:

1. In a pressure compensating flow control valve, a casing having an inlet and an outlet, an orifice member mounted within said casing between said inlet and said outlet and having an orifice leading therethrough, a flow control metering pin extending through said orifice in axial alignment therewith and spaced inwardly thereof, said orifice member being movable along said metering pin against gravity by the pressure of fluid acting thereon, and a weight on said orifice member and opposing movement of said orifice member along said metering pin by the pressure of fluid acting thereon.

2. In a pressure compensating flow control valve, a casing having an inlet and an outlet, an orifice member mounted within said casing between said inlet and said outlet and movable along said casing in one direction by gravity and in an opposite direction by the pressure of fluid acting thereon from said inlet, said orifice member having an orifice leading therethrough, a flow control metering pin mounted in said casing and extending through said orifice in axial alignment with said orifice and being free from said orifice throughout the range of movement of said orifice member, a weight on said orifice member, a spring cooperating with said weight to oppose movement of said orifice member along said metering pin by the pressure of fluid acting thereon.

3. In a pressure compensating flow control valve, a casing having an inlet leading through the bottom thereof and an outlet leading through a wall thereof, a diaphragm extending across said casing between said inlet and said outlet and movable along said casing against gravity by the pressure of fluid entering said casing through said inlet, a thin rigid orifice leading through said diaphragm, a metering pin mounted in said casing in axial alignment with said orifice and having a tapered end portion extending entirely through said orifice, and being free from said orifice throughout the range of movement of said diaphragm and orifice, and varying rate spring means encircling said metering pin and engaging said diaphragm to oppose movement of said diaphragm by the pressure of fluid acting on said diaphragm through said inlet.

4. In a pressure compensating flow control valve, a casing having an inlet through the bottom thereof and an outlet leading through a wall thereof in vertically spaced relation with respect to said inlet, a diaphragm extending across said casing between said inlet and said outlet and subject to the pressure of fluid entering said casing through said inlet, an orifice member carried by said diaphragm and having a rigid orifice leading therethrough, a metering pin mounted in said casing in axial alignment with said orifice and having a tapered end portion extending through said orifice and being free from said orifice throughout the range of movement thereof, an annular weight encircling said orifice and uniformly acting on said orifice member and opposing movement of said orifice member along said casing by the pressure of fluid acting thereon, and spring means acting on said orifice member and augmenting said weight.

5. In a pressure compensating flow control valve particularly adapted for a hot water heater for cars and providing a uniform rate of flow of hot water to the heater, regardless of variations in rate of flow of water delivered by the engine, a casing having an inlet adapted to be connected to the water jacket of an automobile engine and having an outlet leading therefrom for connection to the inlet of the hot water heater, a diaphragm mounted within said casing between said inlet and said outlet for movement along said casing by the pressure of fluid acting thereon, a thin rigid metal orifice member mounted on said diaphragm, spring means balancing said diaphragm and orifice member against the pressure of fluid entering said inlet, and a flow control metering pin having a converging end portion extending entirely through the orifice of said orifice member in axial alignment with said inlet, said pin being free from the orifice of said orifice member for the full range of movement of said orifice member and cooperating with said orifice member to provide a varying area annular orifice delivering a predetermined uniform rate of flow of hot water, regardless of variations in rate of flow of the water delivered by the engine.

6. A pressure compensating flow control valve particularly adapted for a hot water heater for cars and delivering a predetermined uniform rate of flow of hot water to the heater regardless of variations in flow of water delivered by the engine, comprising a casing having an inlet leading thereinto from the bottom thereof and an outlet leading thereinto through a wall thereof, a thin orifice member mounted within said casing between said inlet and said outlet for movement along said casing and having an orifice in axial alignment with said inlet, spring means balancing said orifice member against fluid under pressure acting thereon from said inlet, a converging flow control metering pin adjustably mounted within said casing and extending entirely through the orifice of said orifice member in axial alignment with said inlet, and means adjustably moving said metering pin with respect to the orifice of said orifice member to vary the delivery rate of flow of said valve, said metering pin being of a lesser diameter than the diameter of said orifice for the full range of adjustable movement of said metering pin and for the full range of movement of said orifice member along said metering pin and cooperating with said orifice to provide a varying area annular orifice delivering a predetermined rate of flow of fluid through said orifice regardless of variations in the pressure of the fluid entering said casing through said inlet.

7. A pressure responsive flow control valve compensating for varying pressures of fluid delivered to the valve comprising a casing having an inlet through the bottom thereof and an outlet through a wall thereof, a diaphragm extending across said casing between said inlet and said outlet and subject to the pressure of fluid entering said casing through said inlet, a diaphragm plate on said diaphragm having an orifice extending therethrough, a metering pin mounted in said casing in axial alignment with said inlet and having a converging metering portion extending through said orifice and being free from said orifice throughout the range of movement of said orifice, a weight on said diaphragm balancing the pressure of fluid acting thereon through said inlet, and means manually operable to vary the position of said metering pin with respect to said orifice to select the delivery volume of fluid at said outlet.

8. A pressure responsive flow control valve for association with the water jacket of an internal combustion engine for providing a predetermined uniform delivery volume of hot water regardless of variations in delivery volume of hot water from the engine, comprising a casing having an inlet through the bottom thereof and having an outlet through a wall thereof, a diaphragm extending across said casing between said inlet and said outlet and subject to the pressure of water entering said casing through said inlet, a diaphragm plate on said diaphragm having an orifice extending therethrough in axial alignment with said inlet, a metering pin slidably mounted in said casing and extending thereinto in axial alignment with said inlet and having a converging end portion extending through said orifice and being of a less cross-sectional area than said orifice throughout the entire range of movement thereof, a spring augmented by a weight acting on said diaphragm and balancing the pressure of fluid acting thereon through said inlet and means connected with said metering pin and vary the position of said metering pin with respect to said orifice and the delivery rate of the valve.

9. In a pressure compensating flow control valve, a casing having an inlet leading through the bottom thereof and an outlet leading through a wall thereof, a diaphragm extending across said casing between said inlet and said outlet and movable along said casing against gravity by the pressure of fluid entering said casing through said inlet, a rigid orifice leading through said diaphragm, a metering pin mounted in said casing in axial alignment with said orifice and having a converging end portion extending through said orifice, said metering pin being free from said orifice throughout the range of movement thereof, and a conical spring interposed between said metering pin and diaphragm, and loaded to provide an increasing rate of pressure on said diaphragm opposing movement of said diaphragm as the pressure of fluid acting on said diaphragm through said inlet increases.

10. A hot water heater control for the passenger compartment of an automobile having an internal combustion engine having a water jacket and a hot water heater connected thereto, comprising means supplying a uniform rate of flow of hot water from said water jacket to said heater regardless of varying engine speeds and including an adjustable pressure compensating flow control valve having an inlet connected with the water jacket of the car engine and an outlet connected with the car heater, a rigid movable orifice member associated with the inlet and having an orifice leading therethrough and moved by the pressure of fluid acting thereon, a metering pin having a converging metering end portion extending through said orifice and adjustable along said orifice to provide a variable area annular orifice in accordance with the desired rate of flow of hot water to the heater and the temperature of air delivered to the car, and varying rate spring means loaded in relation to the pressure on said orifice member to provide a uniform flow rate of hot water to the heater for any setting of said metering pin, regardless of variations in speed of the engine.

References Cited in the file of this patent

UNITED STATES PATENTS

| | | |
|---|---|---|
| 1,997,404 | Hamilton | Apr. 9, 1935 |
| 2,103,178 | Raymond | Dec. 21, 1937 |
| 2,117,891 | Kalin | May 17, 1938 |
| 2,219,408 | Benz | Oct. 29, 1940 |
| 2,326,093 | Carter | Aug. 3, 1943 |
| 2,463,908 | Rose | Mar. 8, 1949 |
| 2,623,331 | Greening | Dec. 30, 1952 |
| 2,684,081 | Chace | July 20, 1954 |
| 2,704,551 | Ralston | Mar. 22, 1955 |

FOREIGN PATENTS

| | | |
|---|---|---|
| 498,750 | France | Oct. 29, 1919 |